US009525803B2

(12) United States Patent
Li et al.

(10) Patent No.: US 9,525,803 B2
(45) Date of Patent: Dec. 20, 2016

(54) OBJECT DETECTION USING MOTION ESTIMATION (75) Inventors: Qiang Li, Beijing (CN); Jianguo Li, Beijing (CN); Yi-Jen Chiu, San Jose, CA (US); Ya-Ti Peng, Sunnyvale, CA (US); Yangzhou Du, Beijing (CN)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 13/997,092

(22) PCT Filed: Dec. 30, 2011

(86) PCT No.: PCT/CN2011/084991
§ 371 (c)(1),
(2), (4) Date: Mar. 31, 2014

(87) PCT Pub. No.: WO2013/097166
PCT Pub. Date: Jul. 4, 2013

(65) Prior Publication Data
US 2014/0226865 A1   Aug. 14, 2014

(51) Int. Cl.
*G06K 9/00* (2006.01)
*H04N 5/14* (2006.01)
*G06T 7/20* (2006.01)
*G06K 9/32* (2006.01)
*G06K 9/62* (2006.01)

(52) U.S. Cl.
CPC ............ *H04N 5/145* (2013.01); *G06K 9/3216* (2013.01); *G06K 9/3233* (2013.01); *G06K 9/6267* (2013.01); *G06T 7/204* (2013.01); *G06T 7/2013* (2013.01)

(58) Field of Classification Search
USPC ......................................................... 382/107
See application file for complete search history.

(56) References Cited

U.S. PATENT DOCUMENTS 5,493,344 A   2/1996   Yu
6,738,423 B1  5/2004   Lainema et al.
(Continued)

FOREIGN PATENT DOCUMENTS

CN   101022505 A   8/2007
CN   101299273 A   11/2008
(Continued)

OTHER PUBLICATIONS

International Search Report and Written Opinion received for PCT application No. PCT/CN2011/084991, mailed on Oct. 18, 2012, 11 pages.
(Continued)

*Primary Examiner* — Yon Couso
(74) *Attorney, Agent, or Firm* — Jordan IP Law, LLC (57) ABSTRACT Systems and methods of detecting an object using motion estimation may include a processor and motion estimation and object detection logic coupled to the processor. The motion estimation and object detection logic may be configured to include logic to detect an object in a frame of a video based on motion estimation. The video may include a first frame and a second frame. The motion estimation may be performed on a region of the second frame using sum of absolute difference between the region of the second frame and a corresponding region of the first frame.

25 Claims, 9 Drawing Sheets (56) References Cited

U.S. PATENT DOCUMENTS

2008/0285653 A1* 11/2008 Chang ............... H04N 19/105
375/240.16
2011/0075935 A1 3/2011 Baqai et al.

FOREIGN PATENT DOCUMENTS

| CN | 101309407 A | 11/2008 |
|---|---|---|
| CN | 102034113 A | 4/2011 |
| JP | H0750826 A | 2/1995 |
| JP | H10241076 A | 9/1998 |
| JP | 2003040016 A | 2/2003 |
| JP | 2006236063 A | 9/2006 |
| TW | 200841276 A | 10/2008 |
| TW | 200845766 A | 11/2008 |
| WO | 2011/017823 A1 | 2/2011 |
| WO | 2013/097166 A1 | 7/2013 |

OTHER PUBLICATIONS

Gui-Guang et al., "Motion Vector Estimation Using Line-Square Search Block Matching Algorithm for Video Sequences", EURASIP Journal on Applied Signal Processing 2004:11, pp. 1750-1756.

Lampert et al., "Beyond Sliding Windows: Object Localization by Efficient Subwindow Search", IEEE Conference on Computer Vision and Pattern Recognition, CVPR, 2008, pp. 1-8.

Vassiliadis et al., "The Sum-Absolute-Difference Motion Estimation Accelerator", Proceedings of the 24th Conference on EUROMICRO, vol. 2, 1998, pp. 559-566.

Viola et al., "Rapid Object Detection using a Boosted Cascade of Simple Features" Accepted Conference on Computer Vision and Pattern Recognition, 2001, pp. 1-9.

Office Action for Taiwanese Patent Application No. 101150507, dated Jun. 4, 2015, 27 pages, includes 13 pages of English translation.

Office Action for Japanese Patent Application No. 2014-549288, dated Jun. 16, 2015, 6 pages, includes 3 pages of English Translation.

Wei Zeng et al., "Robust moving object segmentation on H.264/AVC compressed video using the block-based MRF model", Real-Time Imaging, Jun. 22, 2005, 12 pages, vol. 11, Beijing China.

Mirza et al., "Automatic Moving Object Segmentation Using Adaptive Thresholding and Static Background Detection", 14th Annual Symposium of the Pattern Recognition Association of South Africa, Nov. 27, 2003, 6 pages.

Extended European Search Report for EP Patent Application No. 11878574.0, mailed Jan. 21, 2016, 7 pages.

Office Action for Taiwanese Patent Application No. 101150507, mailed Jun. 21, 2016, 8 pages including 4 pages of English translation.

* cited by examiner

OBJECT DETECTION USING MOTION ESTIMATION

BACKGROUND

Reliable real-time object detection and recognition in natural images and videos may be important in visual search. One approach of object tracking in video is to perform full object detection in each video frames. However, this approach may be very computation intensive.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve an apparatus including logic to perform motion estimation on a region of a second frame of a video having a first frame and the second frame. The apparatus may also include logic to determine whether to perform object detection on the region of the second frame based on the motion estimation on the region of the second frame. The motion estimation may be based on logic to perform sum of absolute difference. The object detection may be based on a classifier function.

Embodiments may involve a system which may include a processor and motion estimation and object detection logic coupled to the processor. The motion estimation and object detection logic may be configured to include logic to detect an object in a frame of a video based on the motion estimation. The video may include a first frame and a second frame. The motion estimation may be performed on a region of the second frame using sum of absolute difference between the region of the second frame and a corresponding region of the first frame. The sum of absolute difference may be performed on macro blocks included in the region of the second frame and in the corresponding region of the first frame. The second frame may be a subsequent frame of the first frame in the video.

Embodiments may involve a computer implemented method which may include performing object detection on multiple regions of a first frame of a video to detect objects included in the first frame. The method may also include performing motion estimation on a region of a second frame of the video, determining whether to perform object detection on the region of the second frame based on the motion estimation on the region of the second frame. The second frame may be subsequent to the first frame in the video. The object detection may be performed using a classifier function.

Embodiments may involve a system which may include a processor, an external power supply coupled to the processor, and motion estimation and object detection logic coupled to the processor. The motion estimation and object detection logic may be configured to include logic to detect an object in a frame of a video based on motion estimation. The video may include a first frame and a second frame. The motion estimation may be performed on a region of the second frame using sa um of absolute difference between the region of the second frame and a corresponding region of the first frame.

Figure 1:
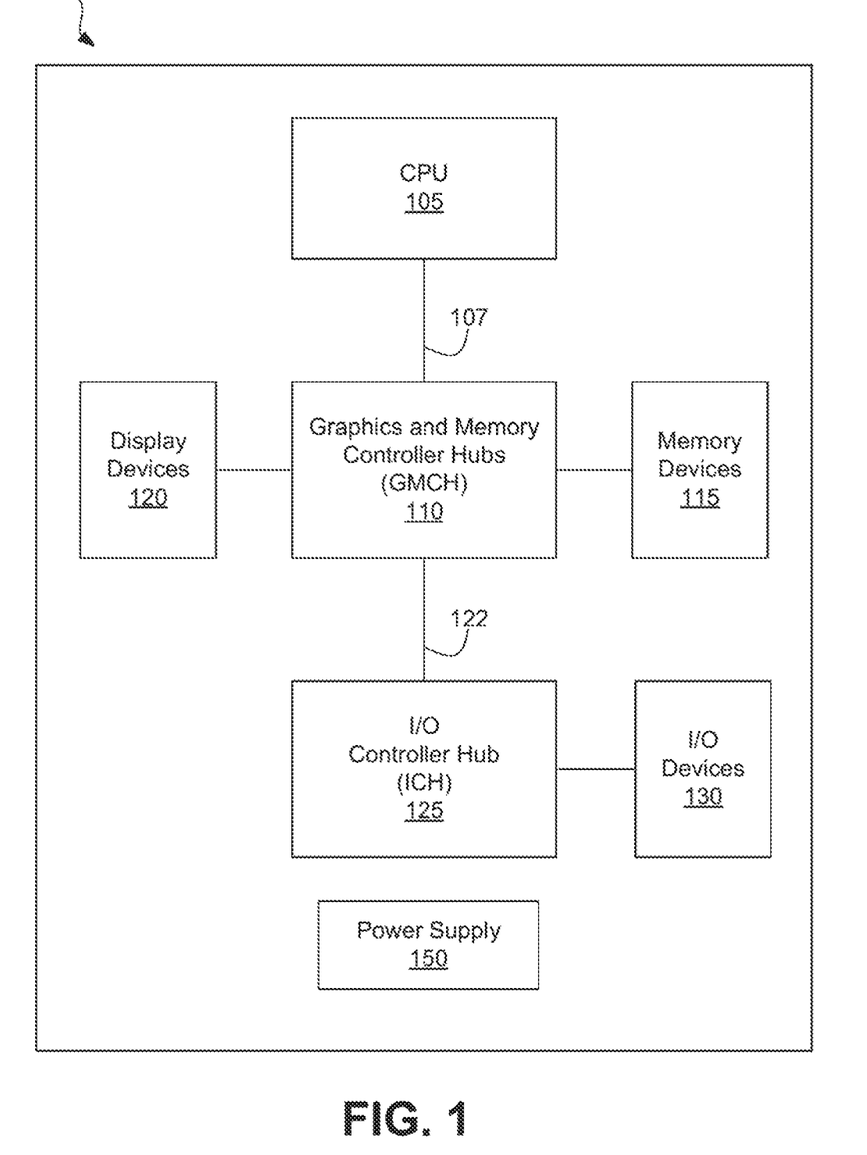
FIG. 1 is a block diagram that illustrates an example computer system, in accordance with some embodiments.

Turning to FIG. 1, a block diagram that illustrates an example computer system 100 is shown, in accordance with some embodiments. The computer system 100 may include a central processing unit (CPU) 105, a graphics and memory controller hub (GMCH) 110, and an input/output controller hub (ICH) 125. The GMCH 110 may be coupled to the CPU 105 via bus 107. The ICH 125 may be coupled to the GMCH 110 via bus 122. The GMCH 110 may also be coupled to memory devices 115 and display devices 120. The ICH 125 may be coupled to I/O devices 130. The GMCH 110 may include a graphics system 200 (shown in FIG. 2). Although the CPU 105, the GMCH 110 and the ICH 125 are illustrated as separate components, the functions of two or more of these components may be combined. A power supply 150 may be used to provide power to the computer system 100. The power supply 150 may be a battery or an external power source. The computer system 100 may also include many other components; however, for simplicity, they are not shown.

Figure 2:
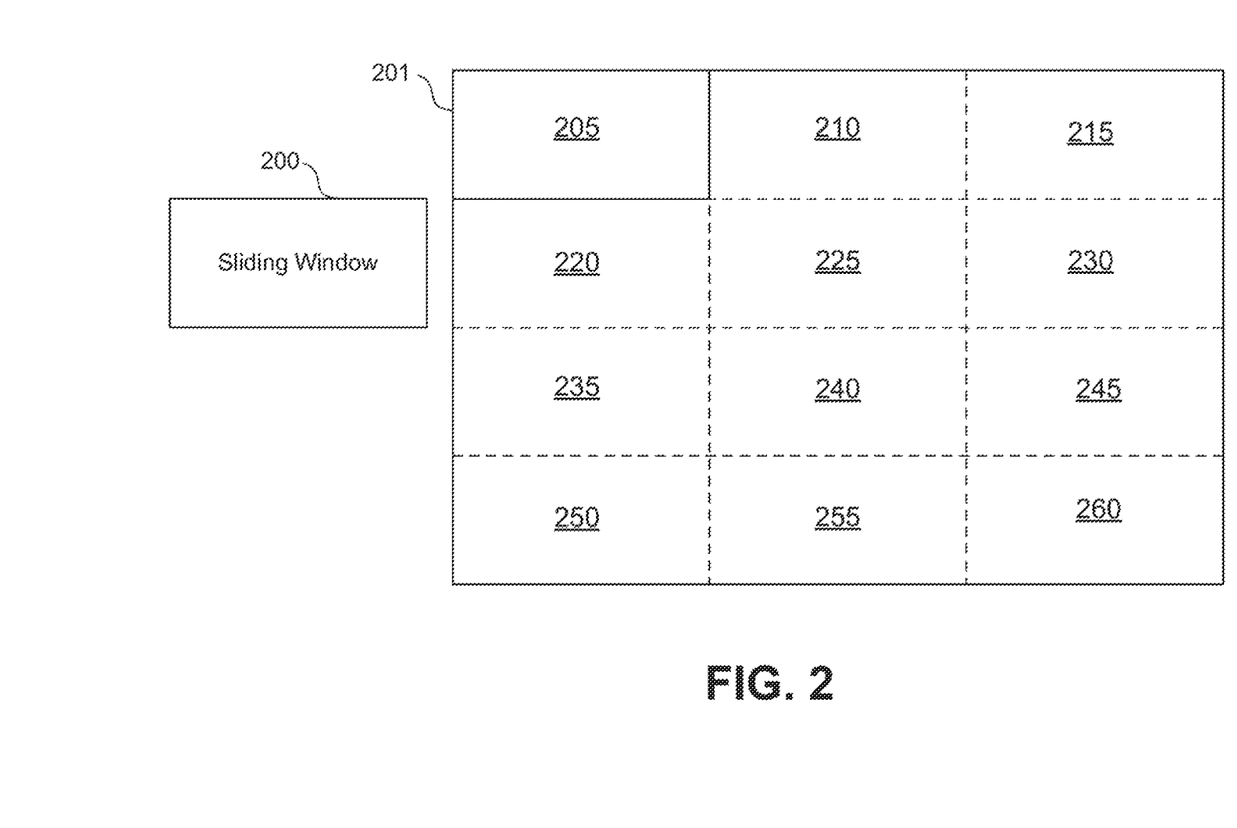
FIG. 2 is a block diagram that illustrates an example of using a sliding window to scan an image, in accordance with some embodiments.

Turning to FIG. 2, a block diagram that illustrates using an example sliding window 200 to scan an image is shown. Sliding window is a technique that may be used to perform object detection and recognition in an image. The sliding window technique may be associated with a classifier function which may be used to detect an object. An object may be determined as being present in an image when a maximal classification score surpasses a threshold. For example the sliding window 200 may be used to scan the image 201 from a top left position to a bottom right position. For the image 201, the sliding window 200 may scan sub-images 205 to 260. The sliding window 200 may have different sizes. For example, the sliding widow 200 may be 16 pixels by 16 pixels. In general, the number of sub-images may increase by N to the fourth power ($N^4$) for an image having a size N×N. For example, the number of sub-images may be more than one billion. The operations associated with the object detection may need to be performed for every sub-mage. That is, the smaller the sliding window 200, the higher the number of computations that may need to be performed. As a result, it may be computationally very expensive to evaluate the classifier function exhaustively for all of the sub-images. The computational cost may be much more expensive when the sliding window technique is applied to multiple frames of a video to detect an object. For example, for a 25 Hz/30 Hz video, the computational cost to perform object detection in a video may be ten (10) times larger than performing object detection for single image.

Figure 3:
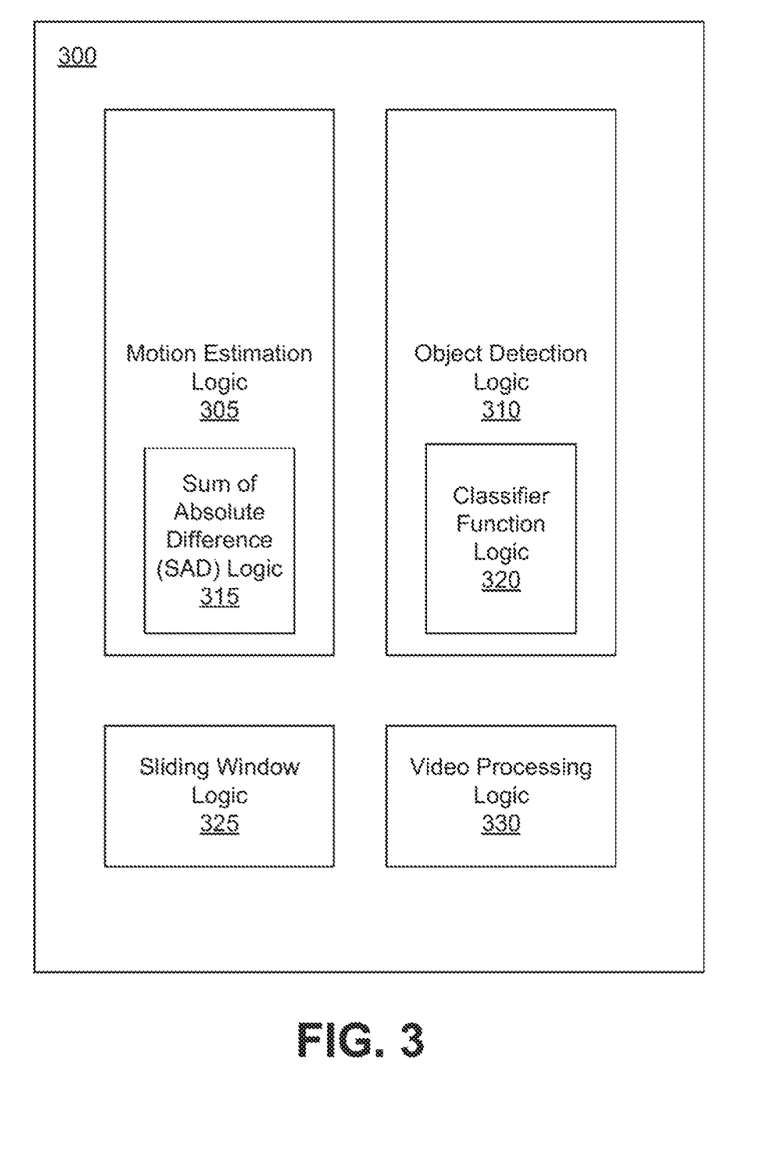
FIG. 3 is a diagram that illustrates an example video motion estimation and detection system, in accordance with some embodiments.

Turning to FIG. 3, a block diagram that illustrates an example video motion estimation and detection system 300 is shown, in accordance with some embodiments. The motion estimation and detection system 300 may include motion estimation logic 305, object detection logic 310, sliding window logic 325, and video processing logic 330. The motion estimation logic 305 may include sum of absolute difference logic 315. The object detection logic 310 may include classifier function logic 320.

For some embodiments, the sliding window logic 325 may be configured to establish sliding windows of different sizes. For example, a small sliding window may be used to scan a video frame to detect small objects in a video frame, whereas a large sliding window may be used to detect a large object in the video frame. The video frame may be received by the video processing logic 330. For some embodiments, the sliding windows of different sizes may be used to perform a full scan for a first frame. The full scan may be performed multiple times using the sliding windows with different sizes in order to detect both small and large objects. For the subsequent frames, instead of performing the full scan, the motion estimation logic 305 may be used to reduce the computation cost.

An area of a frame that may be covered by a sliding window may be referred to as a region. For example, for a video graphics array (VGA) size video input, a sliding window may vary from a smallest size of 20×20 pixels that may cover a region of a frame to a largest size of 480×480 pixels that may cover the entire frame.

The classifier function logic 320 may be configured to detect whether an object may exist within a region of a frame that is covered by a sliding window. The classifier function logic 320 may perform the detection operations based on a maximum classification score. For some embodiments, the classifier function logic 320 may be used to perform the object detection for every region of a first frame. As will be described in greater detail, the classifier function logic 320 may be used to perform the object detection for some regions of a subsequent frame if certain conditions are met.

The motion estimation logic 305 may be configured to determine whether any motion may have taken place within a particular region when comparing a current frame to a previous frame. The operations of the motion estimation logic 305 may be based on motion vector information normally used in video encoding and a sum of absolute difference (SAD) value for each macro block (described in FIG. 4).

The motion estimation logic 305 may be configured to remove temporal redundancy between images in consecutive frames of a video because most of the images in the consecutive frames may be virtually similar. This may enable reusing information included in a previous frame to find motion vector information for the current frame to improve the encoding efficiency. For some embodiments, the motion estimation logic 305 may use the SAD logic 315 to determine if a region of a current frame is similar to the corresponding region of a previous frame.

The object detection logic 310 may be configured to detect an object in a region of a current frame. For example, when certain conditions are met, the object detection logic 310 may apply the classifier function logic 320 to detect the object in the region.

Figure 4:
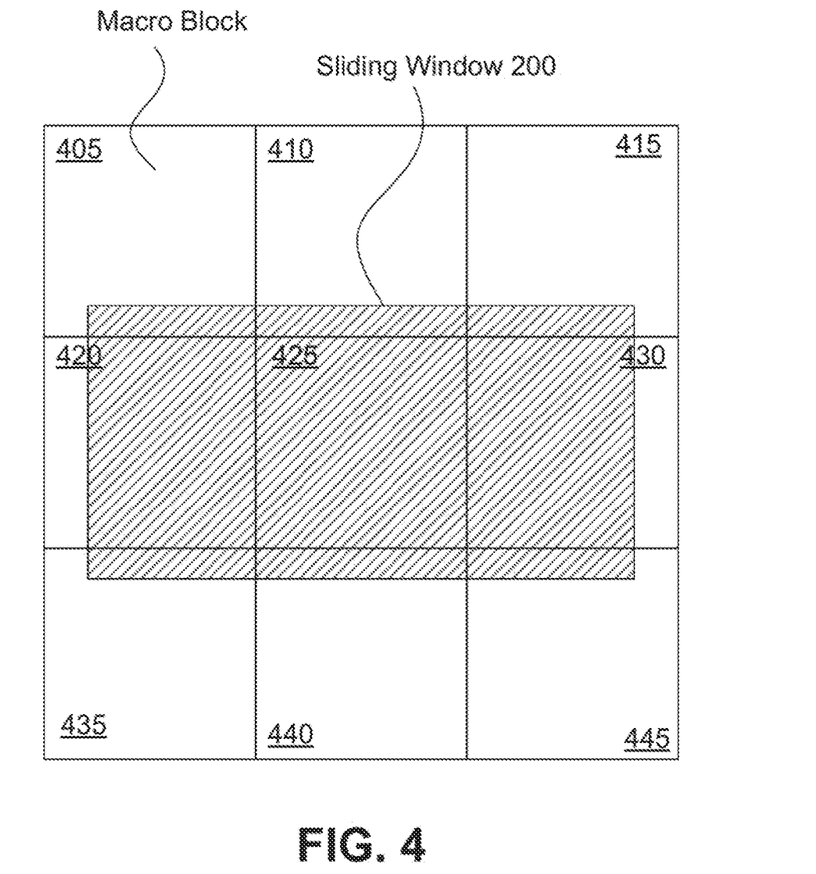
FIG. 4 is a diagram that illustrates examples of macro blocks, in accordance with some embodiments.

Turning to FIG. 4, examples of macro blocks are shown, in accordance with some embodiments. A macro block (MB) may be a basic element for motion estimation and may be used for encoding. A macro block may be 16×16 pixels. In the current example, the sliding window 200 may cover a region (indicated by a rectangle with a diagonal pattern) that includes nine macro blocks 405 to 445. In general, when a macro block that is associated with a current frame is similar to a region (which has the same MB size) that is associated with a previous frame, that macro block may not need to be encoded for the current frame. The encoding information for the similar image region from the previous frame may be reused.

The SAD logic 315 (FIG. 3) may be configured to determine a SAD associated with a macro block and a SAD associated with a region. The SAD logic 315 may be configured to determine the absolute difference between each pixel in one macro block of a current frame and the corresponding pixel in another macro block of a previous frame. The differences may be summed to create a metric of block similarity. A threshold may be used to determine similarity.

For some embodiments, the SADs from the macro blocks 405 to 445 may be accumulated and used as the SAD for the region that the macro blocks 405 to 445 may be associated with. The SAD for the region may then be compared against a threshold which may be proportional to the number of macro blocks. When the SAD for the region is more than the threshold, it may indicate that the region of the current frame that is covered by the sliding window 200 may not match the corresponding region of the previous frame. In that situation, it may be necessary to use the classifier function to perform the object detection for the region of the current frame. For example, a region of the previous frame may not contain an object, but the corresponding region of the current frame may contain an object. As another example, a region of a previous frame may contain an object in a first position, and the corresponding region of the current frame may also contain the object in a second position. This may indicate that the object has gone through a motion, and therefore it may need to be detected in the current frame. When the SAD for the region is less than the threshold, it may be possible to reuse the encoding information from the corresponding region of the previous frame. For example, if the region in the previous frame does not contain an object, then the corresponding region of the current frame may be considered as not containing an object.

Figure 5:
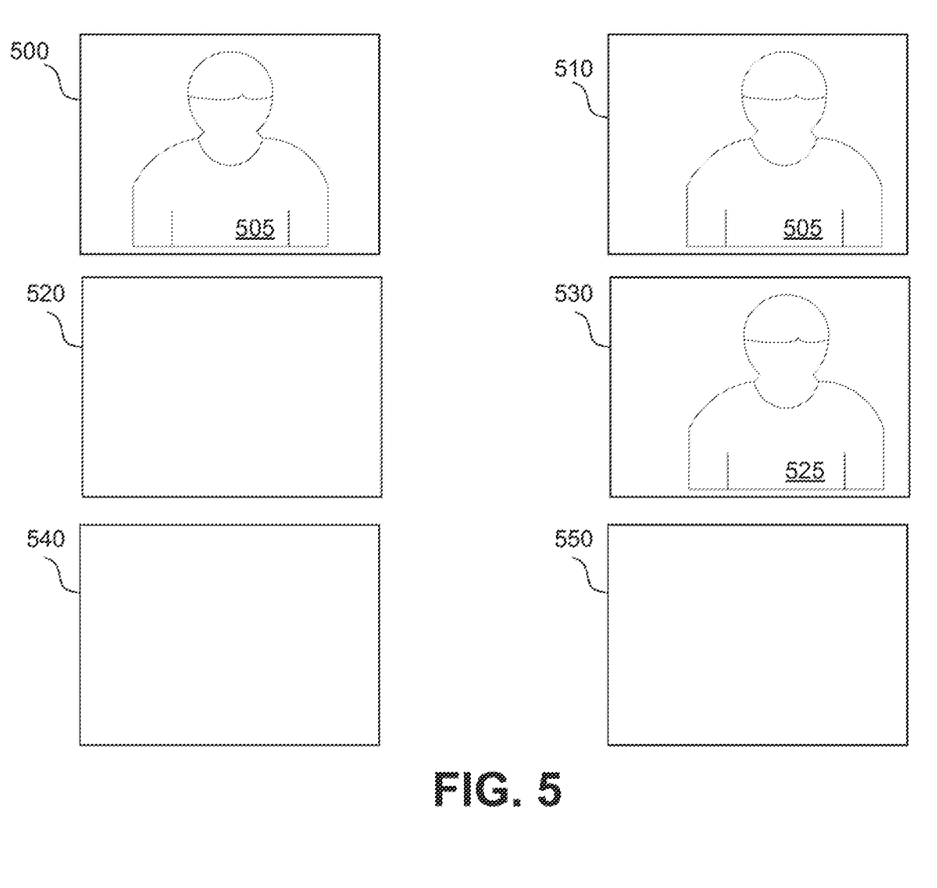
FIG. 5 illustrates example regions of a frame, in accordance with some embodiments.

Turning to FIG. 5, example regions are shown, in accordance with some embodiments. Regions 500, 520 and 540 may be associated with a previous frame, and regions 510, 530 and 550 may be associated with a current frame. The regions 500 and 510 may be used to illustrate a situation when both contain the same object 505 but in different positions. The SAD for the region 510 may be less than the threshold since the second position may be so close (or almost identical) to the first position. A sample area (e.g., a center point) of the region 510 may be determined and verified whether the sample area is located in the region 505. This may be similar to tracking the object 505. For some embodiments, when the sample area of the region 510 is also in the region 505, the classifier function logic 320 (FIG. 3) may be applied to the region 510.

The regions 520 and 530 may be used to illustrate a situation when an object 525 is contained in the region 530 but the object 525 was not contained in the region 520. The SAD for the region 530 may be more than the threshold and the classifier function logic 320 may be applied to the region 530. The situations may be reversed where the object 525 may be contained in the region 520 but not in the region 530. The SAD for the region 530 may be more than the threshold and the classifier function logic 320 may be applied to the region 530. The regions 540 and 550 may be used to illustrate a situation when there is no object in the regions 540 and 550. The SAD for the region 550 may be less than the threshold and the classifier function logic 320 may not need to be applied to the region 550.

Figure 6A:
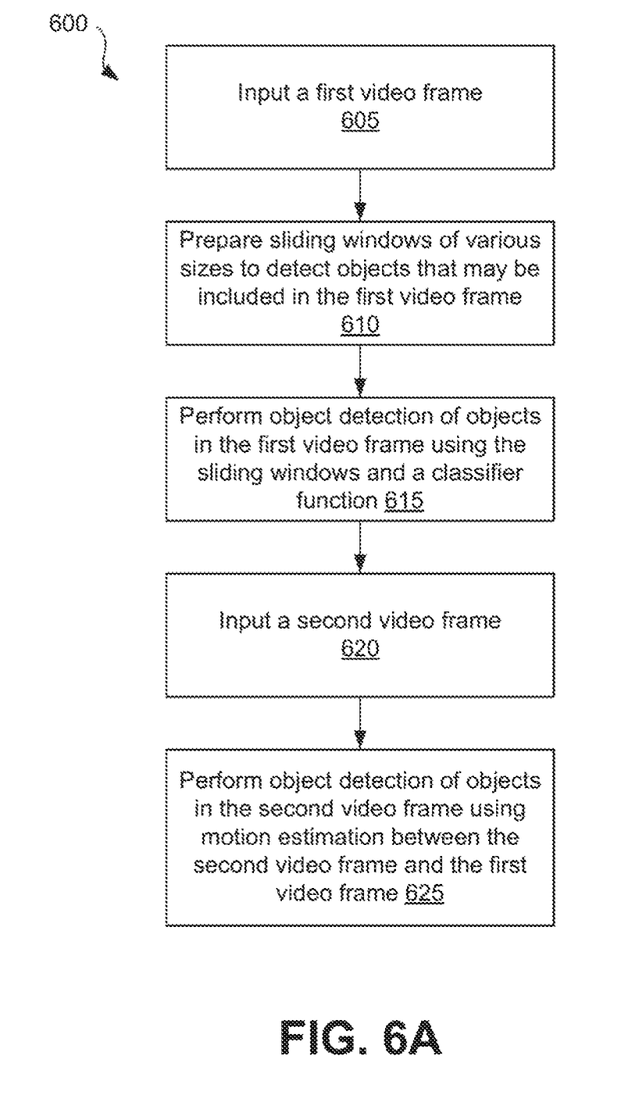
FIG. 6A is a flowchart of an example method of motion estimation and object detection, in accordance with some embodiments.

Turning to FIG. 6A, a method 600 of motion estimation and object detection is shown, in accordance with some embodiments. The method 600 may be associated with the motion estimation and object detection system 300 of FIG. 3. The method 600 may be applied to frames of a video.

At block 605, a first frame of a video may be received. At block 610, sliding windows of different sizes may be used to detect objects in the first frame. At block 615, the classifier function may be used to detect the objects in the first frame using the sliding windows. At block 620, a second video frame is received. At block 625, objects that may be in the second frame may be detected using motion estimation between the second frame and the first frame.

Figure 6B:
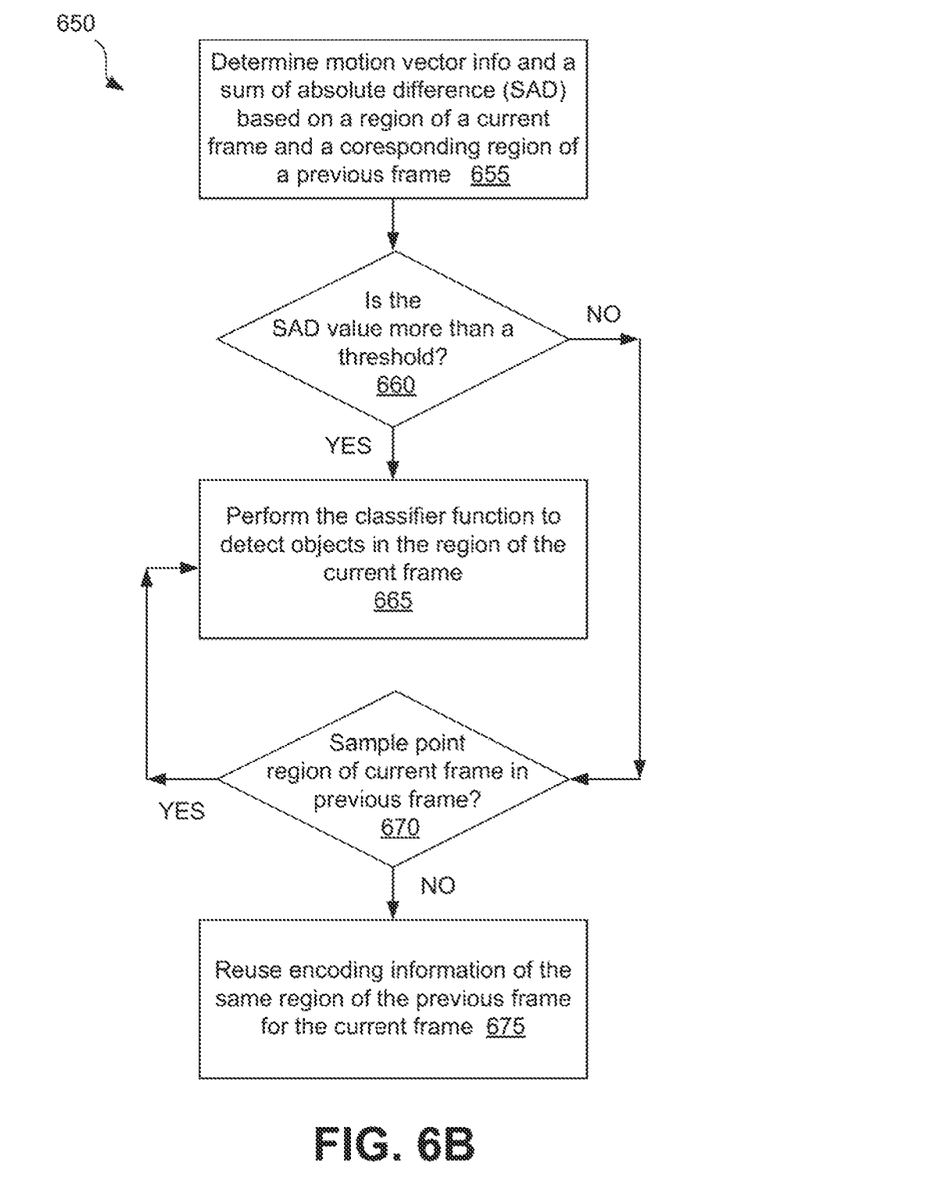
FIG. 6B is a flowchart of an example method of using a sum of absolute difference (SAD) to perform motion estimation and object detection, in accordance with some embodiments.

Turing to FIG. 6B, a method 650 of using the sum of absolute difference (SAD) to perform motion estimation and object detection is shown, in accordance with some embodiments. The method 650 may be applied to regions of a frame. At block 655, motion vector information and a SAD based on a region of a current frame and the corresponding region of a previous frame may be determined. The SAD of the region may be based on the SAD of the macro blocks included in the region. At block 660, the SAD may be compared with a threshold. If the SAD is more than the threshold, the process may continue to block 665 where the classifier function may be performed to detect objects in the region of the current frame. For example, this situation may occur when there is an object in the region of the current frame whereas there may be no object in the corresponding region of the previous frame.

From the block 660, if the SAD is less than or equal to the threshold, then the process may continue to block 670 where a test may be performed to determine whether a sample area (e.g., a center point) of the region of the current frame may be found in the corresponding region of the previous frame. If the sample area is also in the corresponding region of the previous frame, then the process may continue to block 665 where the classifier function may be applied to detect the object in the region of the current frame. For example, this situation may occur when there is an object in the region of the current frame and the object may also exist in the corresponding region of the previous frame with a slight difference possibly due to a motion.

Alternatively, from the block 670, the process may continue to block 675 where the encoding information of the corresponding region of the previous frame may be reused for the current frame. For example, this situation may occur when the same region in both the current frame and the previous frame does not contain any object. The methods 600 and 650 may enable not having to perform the classifier function for the regions that do not contain any object. The method 650 may be repeated for all of the regions of the current frame.

Embodiments of the present invention may greatly improve the performance of the object detection operations by evaluating fewer regions while keeping the same accuracy as if a full detection for each video frame is performed. Embodiments of the present invention may be useful for video related applications (e.g., video conferencing, video surveillance, etc.) where stationary video cameras may be used since most of the regions of the video background may be non-object regions and they may not change significantly overtime, unless when a new object appear in the video. Embodiments of the present invention may be applied directly to raw videos without having to scale the video frame. When scaling may be necessary, the graphics controller may need to maintain a chain of video frames with a constant scaling factor. Each scaled video frame may need to be associated with its own motion information. Embodiments of the present invention may be performed in software, hardware or a combination of both. For some embodiments, the operations of the SAD logic 315 (FIG. 3) or the operations performed in block 655 may be performed in hardware to improve performance and reduce the motion estimation cost. For example, some graphics controller may include hardware acceleration engine that may be used to perform the operations of the SAD logic 315.

The methods described above may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field-programmable gate arrays (FPGAs), complex programmable logic devices (CPLDs), in fixed-functionality logic hardware using circuit technology such as application-specific integrated circuit (ASIC), complementary-symmetry metal-oxide-semiconductor (CMOS) or transistor-transistor logic (TTL) technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Figure 7:
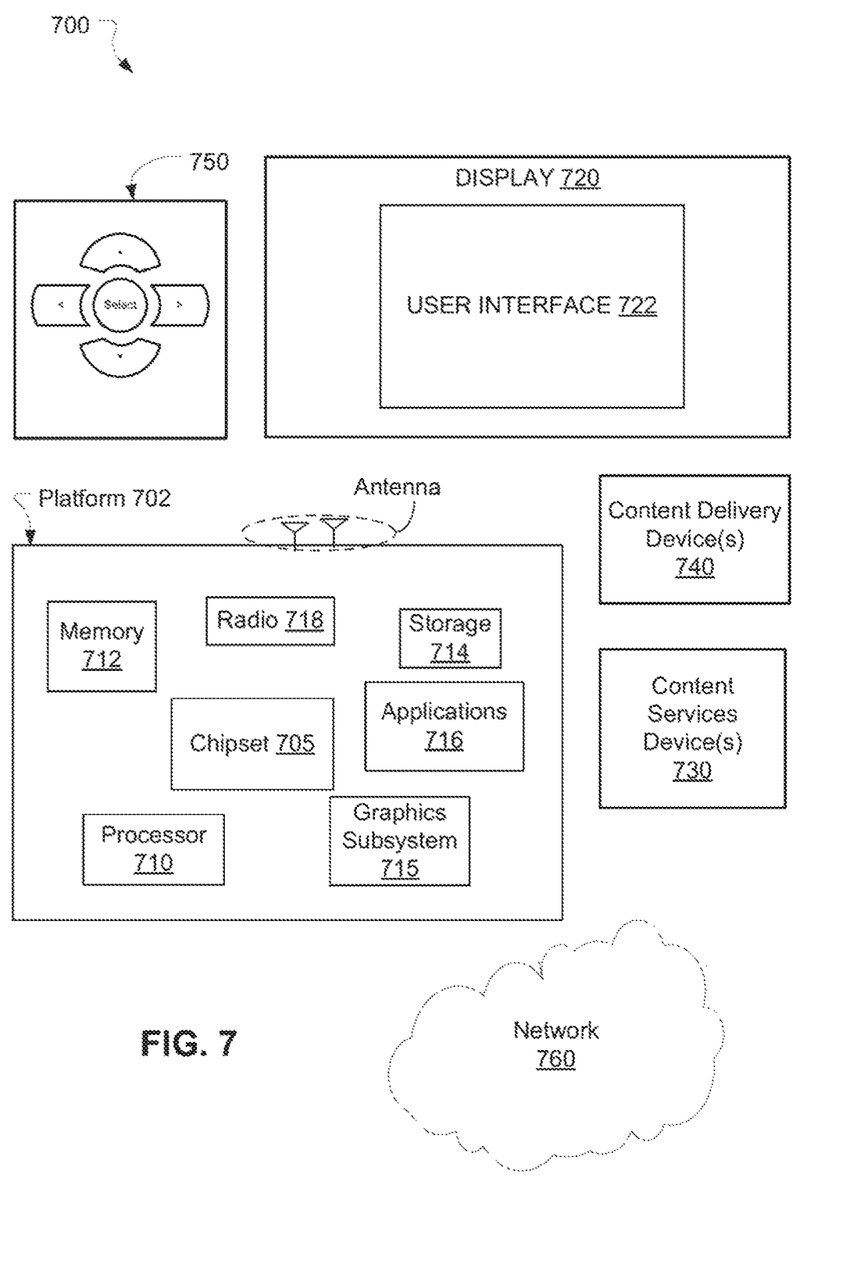
FIG. 7 illustrates an example computer system, in accordance with some embodiments.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off" In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
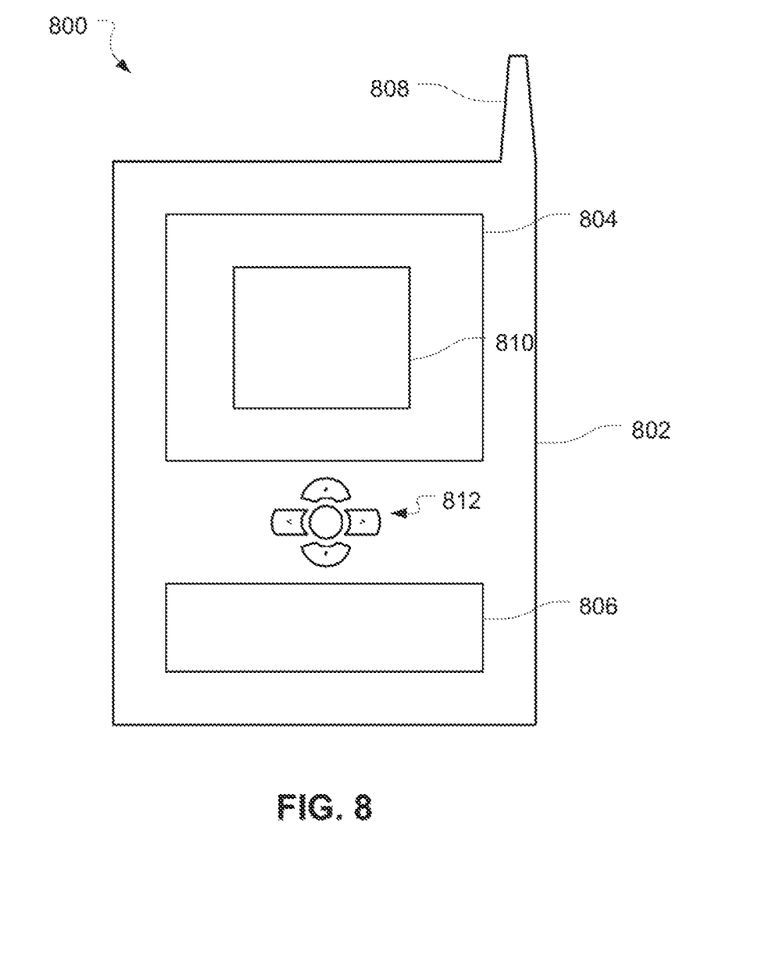
FIG. 8 illustrates an example small form factor device, in accordance with some embodiments.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to integrated circuit (IC) chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification and following claims.

We claim:

1. An apparatus comprising:
configurable or fixed-functionality logic hardware to perform motion estimation on a region of a second frame of a video having a first frame and the second frame; and
logic to determine whether to perform object detection on the region of the second frame based on the motion estimation on the region of the second frame, wherein the second frame is a subsequent frame relative to the first frame in the video, and wherein the logic hardware to perform the motion estimation includes logic to determine a sum of absolute difference between the region of the second frame and a corresponding region of the first frame and to perform object detection based on a comparison of the sum of absolute difference and a threshold.

2. The apparatus of claim 1, wherein the logic to determine the sum of absolute difference includes logic to determine a sum of absolute difference on macro blocks included in the region of the second frame and the corresponding region of the first frame.

3. The apparatus of claim 2, wherein the logic to determine whether to perform the object detection includes logic to perform a classifier function.

4. The apparatus of claim 1, wherein the object detection on the region of the second frame is to be performed if the sum of absolute difference is more than the threshold.

5. The apparatus of claim 1, wherein the object detection on the region of the second frame is to be performed if the sum of absolute difference is less than or equal to the threshold and if a sample area of the region of the second frame is included in the corresponding region of the first frame.

6. The apparatus of claim 5, wherein the object detection on the region of the second frame is not performed if the sum of absolute difference is less than or equal to the threshold and if the sample area on the region of the second frame is not included in the corresponding region of the first frame.

7. The apparatus of claim 6, wherein encoding information of the corresponding region of the first frame is to be reused for the region of the second frame.

8. A system comprising:
a processor; and
motion estimation and object detection logic coupled with the processor and configured to detect an object in a frame of a video based on motion estimation, wherein the video is to include a first frame and a second frame, and wherein the motion estimation is to be performed on a region of the second frame using a sum of absolute difference between the region of the second frame and a corresponding region of the first frame, wherein the motion estimation and object detection logic is further configured to determine whether to detect an object in the region of the second frame based on a comparison of the sum of absolute difference and a threshold.

9. The system of claim 8, wherein the sum of absolute difference is performed on macro blocks included in the region of the second frame and in the corresponding region of the first frame, and wherein the second frame is a subsequent frame of the first frame.

10. The system of claim 8, wherein the logic to detect the object in the region of the second frame is to be performed if the sum of absolute difference is more than the threshold.

11. The system of claim 10, wherein the logic to detect the object in the region of the second frame is to be performed if the sum of absolute difference is less than or equal to the threshold and if a sample area of the region of the second frame is included in the corresponding region of the first frame.

12. The system of claim 11, wherein the object detection on the region of the second frame is to not be performed if the sum of absolute difference is less than or equal to the threshold and if the sample area of the region of the second frame is not included in the corresponding region of the first frame.

13. The system of claim 12, further including logic to perform a classifier function on the region of the second frame in order to detect the object in the region of the second frame.

14. The system of claim 13, wherein encoding information of the corresponding region of the first frame is to be reused for the region of the second frame if the object detection on the region of the second frame is not performed.

15. A computer-implemented method comprising:
performing object detection on multiple regions of a first frame of a video to detect objects included in the first frame;
performing motion estimation on a region of a second frame of the video; and
determining whether to perform object detection on the region of the second frame based on the motion estimation on the region of the second frame, and further determining a sum of absolute difference between the region of the second frame and a corresponding region of the first frame and performing object detection based on a comparison of the sum of absolute difference and a threshold.

16. The method of claim 15, wherein the second frame is subsequent to the first frame in the video, and wherein the performing the object detection includes performing a classifier function.

17. The method of claim 15, wherein the determining whether to perform the object detection on the region of the second frame comprises comparing the sum of absolute difference with a threshold.

18. The method of claim 17, wherein the object detection on the region of the second frame is performed if the sum of absolute difference is more than the threshold.

19. The method of claim 17, wherein the object detection on the region of the second frame is performed if the sum of absolute difference is less than or equal to the threshold and if a sample area of the region of the second frame is included in the corresponding region of the first frame.

20. The method of claim 19, wherein the object detection on the region of the second frame is not performed if the sum of absolute difference is less than or equal to the threshold and if the sample area on the region of the second frame is not included in the corresponding region of the first frame.

21. The method of claim 20, wherein encoding information of the corresponding region of the first frame is reused for the region of the second frame when no object detection is performed on the region of the second frame.

22. A system comprising:
a processor;
an external power supply coupled to the processor;
a motion estimation and object detection logic coupled to the processor and configured to detect an object in a frame of a video based on motion estimation, wherein the video is to include a first frame and a second frame, and wherein the motion estimation is to be performed on a region of the second frame using a sum of absolute difference between the region of the second frame and a corresponding region of the first frame and wherein whether to detect an object in the region of the second frame is based on a comparison of the sum of absolute difference and a threshold.

23. The system of claim 22, wherein the sum of absolute difference is to be performed on macro blocks included in the region of the second frame and in the corresponding region of the first frame, and further including logic to perform a classifier function on the region of the second frame in order to detect the object in the region of the second frame.

24. The system of claim 23, wherein the second frame is a subsequent frame of the first frame.

25. The system of claim 24, wherein the logic to detect the object in the region of the second frame is to be performed if the sum of absolute difference is more than the threshold, wherein the object detection on the region of the second frame is to not be performed if the sum of absolute difference is less than or equal to the threshold, and wherein encoding information of the corresponding region of the first frame is to be reused for the region of the second frame if the object detection on the region of the second frame is not performed.

* * * * *